(12) United States Patent
Solgun

(10) Patent No.: US 11,048,846 B2
(45) Date of Patent: Jun. 29, 2021

(54) SURFACE PARTICIPATION ANALYSIS OF SUPERCONDUCTING QUBITS WITH THE BOUNDARY ELEMENT METHOD

(71) Applicant: International Business Machines Corporation, Armonk, NY (US)

(72) Inventor: Firat Solgun, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 460 days.

(21) Appl. No.: 16/006,346

(22) Filed: Jun. 12, 2018

(65) Prior Publication Data

US 2019/0377845 A1     Dec. 12, 2019

(51) Int. Cl.
G06F 30/367 (2020.01)
G06F 111/20 (2020.01)

(52) U.S. Cl.
CPC ........ *G06F 30/367* (2020.01); *G06F 2111/20* (2020.01)

(58) Field of Classification Search
CPC .......................... G06F 30/367; G06F 2111/20
See application file for complete search history.

(56) References Cited

U.S. PATENT DOCUMENTS

| | | |
|---|---|---|
| 5,761,332 A | 6/1998 | Wischmann et al. |
| 7,904,283 B2 | 3/2011 | Merz, Jr. et al. |
| 8,471,298 B2 | 6/2013 | Lieber et al. |
| 2019/0042677 A1* | 2/2019 | Matsuura ................ G06F 30/20 |

FOREIGN PATENT DOCUMENTS

JP      11296504 A      10/1999

OTHER PUBLICATIONS

Adelman, Ross, et al. FMM/GPU-Accelerated Boundary Element Method for Computational Magnetics and Electrostatics. IEEE Transactions on Magnetics. 2017, vol. 53, Issue: 12.
Zhang, Lei, et al. A Novel Boundary Element Method Using Surface Conductive Absorbers for Full-Wave Analysis of 3-D Nanophotonics. Journal of Lightwave Technology 2011, vol. 29, Issue: 7, pp. 949-959.

(Continued)

*Primary Examiner* — Bijan Mapar
(74) *Attorney, Agent, or Firm* — Amin, Turocy & Watson, LLP

(57) ABSTRACT

Techniques regarding an autonomous surface participation analysis of one or more superconducting qubits using the boundary element method are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise a simulation component, operatively coupled to the processor, that can analyze a surface participation of a superconducting qubit by discretizing a conductor-dielectric interface and a dielectric-dielectric interface into a plurality of panels.

25 Claims, 10 Drawing Sheets

(56) References Cited

OTHER PUBLICATIONS

Eilakestad, R. Braford. Transport of Trapped-Ion Qubits within a Scalable Quantum Processor. University of Colorado, Department of Physics, 2010.

Hong, Seokjun, et al. Guidelines for Designing Surface Ion Traps Using the Boundary Element Method. Sensors 16(5):616, Apr. 2016.

Govind-A-N. Boundary Element Method Laplace solver. Supercomputer Education and Research Centre, Indian Institute of Science, Bangalore—560 012, Jun. 2011.

Liaw. Simulation of surface plasmon resonance of metallic nanoparticles by the boundary-element method. J. Opt. Soc. Am. A/vol. 23, No. 1/Jan. 2006, pp. 108-116.

Wang, et al., Surface participation and dielectric loss in superconducting qubits, Appl. Phys. Lett. 107, 162601 (2015).

Gambetta, et al., Investigating Surface Loss Effects Superconducting Transmon Qubits, IEEE Transactions on Applied Superconductivity 27, No. 1, 1700205 (2017).

Muller, et al. Towards understanding two-level-system in amorphous solids—Insights from quantum devices, arXiv:1705.01108. May 4, 2017. 30 pages.

J. Jackson, Classical Electrodynamics, 2nd Ed., John Wiley & Sons, pp. 77-78, 1975.

Wenner, et al., Surface loss simulations of superconducting coplanar waveguide resonators. Applied Physics Letter 99, 113513 (2011).

Calusine, et al., Analysis and mitigation of interface losses in trenched superconducting coplanar waveguide resonators. arXiv:1709.10015. Sep. 28, 2017. 10 pages.

Ruehli, et al. Efficient Capacitance Calculations for Three-Dimensional Multiconductor Systems, IEEE Transactions on Microwave Theory and Techniques, 21(2):76-82, Feb. 1973.

Rao, S. M., et al. The Electrostatic Field of Conducting Bodies in Multiple Dielectric Media, IEEE Transactions on Microwave Theory and Techniques, MTT-32(11):1441-1448, Nov. 1984.

Haus, Hermann A., et al. Electromagnetic fields and energy, Prentice Hall, 1989.

Nabors, et al. Multipole-accelerated 3-D Capacitance Extraction Algorithms for Structures with Conformal Dielectrics, Design Automation Conference, 1992. Proceedings., 29th ACM/IEEE. 6 pages.

Mel, et al., The NIST Definition of Cloud Computing: Recommendations of the National Institute of Standards and Technology. National Institute of Standards and Technology. Jan. 25, 2016. 7 pages.

International Search Report and Written Opinion received for PCT Application Serial No. PCT/EP2019/064632 dated Sep. 19, 2019, 11 pages.

Wang et al., "Supplementary Materials for Surface participation and dielectric loss in superconducting qubits", Oct. 2, 2015, 6 pages.

\* cited by examiner

600

602 — ANALYZING, BY A SYSTEM OPERATIVELY COUPLED TO A PROCESSOR, SURFACE PARTICIPATION OF A SUPERCONDUCTING QUBIT BY DISCRETIZING A CONDUCTOR-DIELECTRIC INTERFACE AND A DIELECTRIC-DIELECTRIC INTERFACE INTO A PLURALITY OF PANELS

604 — USING, BY THE SYSTEM, THE BOUNDARY ELEMENT METHOD TO ANALYZE THE SURFACE PARTICIPATION

US 11,048,846 B2

SURFACE PARTICIPATION ANALYSIS OF SUPERCONDUCTING QUBITS WITH THE BOUNDARY ELEMENT METHOD

BACKGROUND

The subject disclosure relates to a surface participation analysis of superconducting qubits, and more specifically, to an autonomous surface participation analysis of superconducting qubits using the boundary element method.

One of the dominant energy loss mechanisms affecting the superconducting quantum bits ("qubits") and limiting their coherence is believed to be happening at the amorphous layers at the interfaces between the qubit metallization, the crystalline high-resistivity substrate (e.g., silicon) and the air. This loss mechanism is attributed to the existence of the two-level systems ("TLS"). The standard model proposed to describe a TLS is a charged particle tunneling between two minimum energy states of a double-well potential. Such a system is an electric dipole which can couple to the electric field of the qubit degrees of freedom. TLS's can couple also to phonons, which creates the loss channel affecting the qubits. If the feature sizes of the qubits are large enough one can assume that a bath of TLSs exists and assign a loss tangent and a dielectric constant to the interface layers. To estimate the effect of the interfaces on the qubit lifetime one needs to do a surface participation analysis, wherein the fraction of the total energy residing in the interfaces is computed when the qubit is in its excited state.

Further, to estimate the amount of loss happening at these amorphous interfaces holding the TLSs, conventional techniques assume that there is a bath of TLSs such that one can associate a loss tangent to this region. Then an energy participation analysis can be done by computing the fraction of the qubit energy residing at these interfaces. Such an analysis requires computation of electric fields at regions only a couple of nanometers thick on the qubit metallization.

However, a problem arises in a conventional surface participation analyses of superconducting qubits at least because performing an accurate surface participation analysis can be a challenging task numerically due to disparity of the length scales between the thickness of the amorphous layers and qubit feature sizes and/or due to electric field divergence at the metal edges and/or corners of the qubit metallization. Conventional techniques to perform a surface participation analysis of superconducting qubits simulate the fields and/or the total energy stored on one or more "dummy" surfaces until the point where said planes stop converging and extrapolate from that point all the way to the qubit metallization surfaces assuming a constant power exponent for the electric fields. Such an analysis is usually very cumbersome since it requires sweeping of dummy surfaces for each interface.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can autonomously analyze a surface participation of superconducting qubits using the boundary element method are described.

According to an embodiment, a system is provided. The system can comprise a memory that can store computer executable components. The system can also comprise a processor, operably coupled to the memory, and that can execute the computer executable components stored in the memory. The computer executable components can comprise a simulation component, operatively coupled to the processor, that can analyze a surface participation of a superconducting qubit by discretizing a conductor-dielectric interface and a dielectric-dielectric interface into a plurality of panels. An advantage of such a system is that various parameters (e.g., energy stored, charge density, and/or electric field) associated with the conductor-dielectric and/or the dielectric-dielectric interfaces can be computed without the use of conventional extrapolations (e.g., such as assuming a constant power exponent for the electric field in one or more regions of the superconducting qubit subject to electric field and/or charge density divergence); thereby reducing computational requirements and/or increasing the accuracy of the analysis.

In some examples, the system can further comprise a conductor analysis component, operatively coupled to the processor, that can determine an amount of energy stored in an amorphous layer comprised within the conductor-dielectric interface based on a charge induced on a mesh of conductor panels from the plurality of panels. An advantage of such a system is that although charge densities diverge, like electric fields, at the conductor edges and/or corners of the superconducting qubit, the total charges on respective conductor panels of the mesh can be convergent quantities.

Further, in some examples, the system can also advantageously comprise a dielectric analysis component, operatively coupled to the processor, that can calculate a second amount of energy stored in a second amorphous layer comprised within the dielectric-dielectric interface based on a second charge induced on a mesh of panels from the plurality of panels and an electric field on a side surface of a qubit pad of the superconducting qubit. An advantage of such a system is that the surface participation analysis can include an accurate computation of charge density and/or electric field at dielectric-dielectric interfaces, such as between a crystalline substrate of the superconducting qubit and/or adjacent air.

According to an embodiment, a computer-implemented method is provided. The computer-implemented method can comprise analyzing, by a system operatively coupled to a processor, a surface participation of a superconducting qubit by discretizing a conductor-dielectric interface and a dielectric-dielectric interface into a plurality of panels. An advantage of such a computer-implemented method is that various parameters (e.g., energy stored, charge density, and/or electric field) associated with the conductor-dielectric and/or the dielectric-dielectric interfaces can be computed without the use of conventional extrapolations (e.g., such as assuming a constant power exponent for the electric field in one or more regions of the superconducting qubit subject to electric field and/or charge density divergence); thereby reducing computational requirements and/or increasing the accuracy of the analysis.

In some examples, computer-implemented method can comprise determining, by the system, an amount of energy stored in an amorphous layer comprised within the conductor-dielectric interface based on a charge induced on a mesh of conductor panels from the plurality of panels. An advantage of such a computer-implemented method is that although charge densities diverge, like electric fields, at the conductor edges and/or corners of the superconducting qubit, the total charges on respective conductor panels of the mesh can be convergent quantities.

Further, in some embodiments, the computer-implemented method can optionally comprise determining, by the system, a second amount of energy stored in a second amorphous layer comprised within the dielectric-dielectric interface based on a second charge induced on a mesh of panels from the plurality of panels and an electric field on a side surface of a qubit pad of the superconducting qubit. An advantage of such a computer-implemented method is that the surface participation analysis can include an accurate computation of charge density and/or electric field at dielectric-dielectric interfaces, such as between a crystalline substrate of the superconducting qubit and/or adjacent air.

According to an embodiment, a computer program product that can determine a surface participation ratio of a superconducting qubit is provided. The computer program product can comprise a computer readable storage medium having program instructions embodied therewith. The program instructions can be executable by a processor to cause the processor to analyze, by a system operatively coupled to the processor, a surface participation of the superconducting qubit by discretizing a conductor-dielectric interface and a dielectric-dielectric interface into a plurality of panels. An advantage of such a computer program product is that various parameters (e.g., energy stored, charge density, and/or electric field) associated with the conductor-dielectric and/or the dielectric-dielectric interfaces can be computed without the use of conventional extrapolations (e.g., such as assuming a constant power exponent for the electric field in one or more regions of the superconducting qubit subject to electric field and/or charge density divergence); thereby reducing computational requirements and/or increasing the accuracy of the analysis.

In some examples, the computer program instructions can further cause the processor to determine, by the system, an amount of energy stored in an amorphous layer comprised within the conductor-dielectric interface based on a charge induced on a mesh of conductor panels from the plurality of panels. The mesh of conductor panels can characterize a qubit metallization layer of the superconducting qubit. Also, in a first portion of the mesh of conductor panels can characterize an edge of the qubit metallization layer and can be finer than a second portion of the mesh of conductor panels, which can characterize a central region of the qubit metallization layer. An advantage of such a computer program product is that although charge densities diverge, like electric fields, at the conductor edges and/or corners of the superconducting qubit, the total charges on respective conductor panels of the mesh can be convergent quantities.

Further, in some examples, the computer program instructions can also cause the processor to calculate, by the system, a second amount of energy stored in a second amorphous layer comprised within the dielectric-dielectric interface based on a second charge induced on a mesh of panels from the plurality of panels and an electric field on a side surface of a qubit pad of the superconducting qubit. The energy stored in the amorphous layer is a function of the charge induced on the mesh of conductor panels. An advantage of such a computer-implemented method is that the surface participation analysis can include an accurate computation of charge density and/or electric field at dielectric-dielectric interfaces, such as between a crystalline substrate of the superconducting qubit and/or adjacent air.

According to another embodiment, a system is provided. The system can comprise a memory that can store computer executable components. The system can also comprise a processor, operably coupled to the memory, and that can execute the computer executable components stored in the memory. The computer executable components can comprise a simulation component, operatively coupled to the processor, that can analyze a surface participation of a superconducting qubit with a boundary element method based on an amount of energy stored in an amorphous region of a conductor-dielectric interface and a dielectric-dielectric interface of the superconducting qubit. An advantage of a such as system is that one or more electrostatic boundary element method solvers (e.g., such as FastCap) can be utilized to solve for one or more parameters (e.g., total charge) characterizing a mesh of panels that can be generated (e.g., by the simulation component) to facilitate the boundary element method.

Further, in some examples, the system can advantageously comprise a conductor analysis component, operatively coupled to the processor, that can determine the amount of energy stored in the amorphous region at the conductor-dielectric interface based on a charge induced on a mesh of conductor panels at the conductor-dielectric interface. Also, the system can comprise a dielectric analysis component, operatively coupled to the processor, that can calculate the amount of energy stored in the amorphous region of the dielectric-dielectric interface based on a second charge induced on a mesh of panels at the dielectric-dielectric interface and an electric field on a side surface of a qubit pad of the superconducting qubit. An advantage of such a system is that although charge densities diverge, like electric fields, at the conductor edges and/or corners of the superconducting qubit, the total charges on respective conductor panels of the mesh can be convergent quantities.

According to another embodiment, a computer program product that can determine a surface participation ratio of a superconducting qubit is provided. The computer program product can comprise a computer readable storage medium having program instructions embodied therewith. The program instructions can be executable by a processor to cause the processor to analyze, by a system operatively coupled to the processor, a surface participation of a superconducting qubit with a boundary element method based on an amount of energy stored in an amorphous region of a conductor-dielectric interface and a dielectric-dielectric interface of the superconducting qubit. An advantage of a such as a computer program product is that one or more electrostatic boundary element method solvers (e.g., such as FastCap) can be utilized to solve for one or more parameters (e.g., total charge) characterizing a mesh of panels that can be generated (e.g., by the system) to facilitate the boundary element method.

Further, in another embodiment, the computer program instructions further cause the processor to determine, by the system, the amount of energy stored in the amorphous region at the conductor-dielectric interface based on a charge induced on a mesh of conductor panels at the conductor-dielectric interface. Additionally, the computer program instructions can cause the processor to calculate, by the system, the amount of energy stored in the amorphous region of the dielectric-dielectric interface based on a second charge induced on a mesh of panels at the dielectric-dielectric interface and an electric field on a side surface of a qubit pad of the superconducting qubit. An advantage of such a computer program product is that although charge densities diverge, like electric fields, at the conductor edges and/or corners of the superconducting qubit, the total charges on respective conductor panels of the mesh can be convergent quantities.

DETAILED DESCRIPTION

Figure 1:
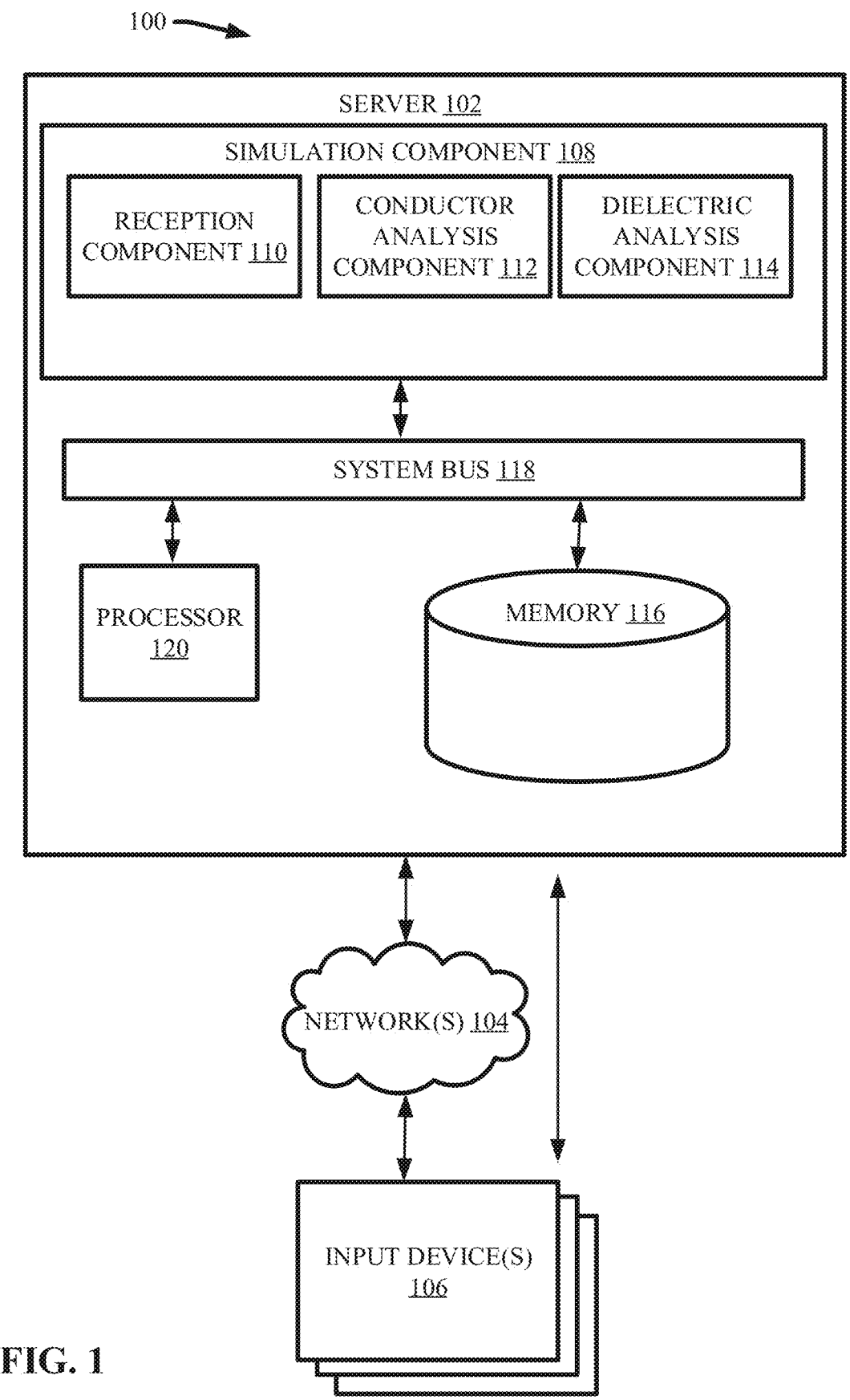
FIG. 1 illustrates a block diagram of an example, non-limiting system that can analyze a surface participation of one or more superconducting qubits using the boundary element method in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Given the above problems with prior art computation techniques for performing a surface participation analysis of one or more superconducting qubits, the present disclosure can be implemented to produce a solution to one or more of these problems in the form of a surface participation analysis using the boundary element method ("BEM"). Systems, computer-implemented methods, and/or computer program products implementing such a surface participation analysis can have an advantage of reduced computational requirements and/or increased accuracy, as compared to conventional techniques. For example, this advantage can be attributed to the generation of a mesh of panels to facilitate the BEM, wherein electric field and/or charge density parameters can be computed as convergent quantities despite said parameters divergence at conductor edges and/or corners of the superconducting qubit. Additionally, various embodiments described herein can advantageously determine the amount of energy stored in one or more amorphous layers formed at conductor-dielectric and/or dielectric-dielectric interfaces of the superconducting qubit. Moreover, one or more embodiments described herein can advantageously determine a charge density and/or an electric field at one or more dielectric-dielectric interfaces of the superconducting qubit with unprecedented accuracy.

Various embodiments of the present invention can be directed to computer processing systems, computer-implemented methods, apparatus and/or computer program products that facilitate the efficient, effective, and autonomous (e.g., without direct human guidance) analysis of a surface participation of one or more superconducting qubits with the BEM. In one or more embodiments, two-dimensional ("2D") interfaces between conductor and dielectrics and/or between two dielectrics can be meshed using the BEM to provide a more efficient and/or accurate analysis of a surface participation of one or more superconducting qubits than otherwise achieved by conventional techniques, such as finite element methods ("FEM"), wherein the full volume is meshed into volume elements.

The computer processing systems, computer-implemented methods, apparatus and/or computer program products employ hardware and/or software to solve problems that are highly technical in nature (e.g., autonomously analyzing a surface participation of one or more superconducting qubits with the BEM), that are not abstract and cannot be performed as a set of mental acts by a human. For example, an individual, or even a plurality of individuals, cannot readily collect, maintain, and/or analyze vast volumes of data as expeditiously and/or efficiently as the various embodiments described herein. Additionally, one or more embodiments described herein can utilize AI technologies that are autonomous in their nature to facilitate determinations and/or predictions that cannot be readily performed by a human.

FIG. 1 illustrates a block diagram of an example, non-limiting system 100 that can perform a surface participation analysis of one or more superconducting qubits using the BEM in accordance with one or more embodiments described herein. Repetitive description of like elements employed in other embodiments described herein is omitted for sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines, e.g., computers, computing devices, virtual machines, etc. can cause the machines to perform the operations described.

As shown in FIG. 1, the system 100 can comprise one or more servers 102, one or more networks 104, and/or one or more input devices 106. The server 102 can comprise simulation component 108. The simulation component 108 can further comprise reception component 110, conductor analysis component 112, and/or dielectric analysis component 114. Also, the server 102 can comprise or otherwise be associated with at least one memory 116. The server 102 can further comprise a system bus 118 that can couple to various components such as, but not limited to, the simulation component 108 and associated components, memory 116 and/or a processor 120. While a server 102 is illustrated in FIG. 1, in other embodiments, multiple devices of various types can be associated with or comprise the features shown in FIG. 1. Further, the server 102 can communicate with a cloud computing environment via the one or more networks 104.

The one or more networks 104 can comprise wired and wireless networks, including, but not limited to, a cellular network, a wide area network (WAN) (e.g., the Internet) or a local area network (LAN). For example, the server 102 can communicate with the one or more input devices 106 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the simulation component 108 can be provided on the one or more servers 102, it should be appreciated that the architecture of system 100 is not so limited. For example, the simulation component 108, or one or more components of simulation component 108, can be located at another computer device, such as another server device, a client device, etc.

The one or more input devices 106 can comprise one or more computerized devices, which can include, but are not limited to: personal computers, desktop computers, laptop computers, cellular telephones (e.g., smart phones), computerized tablets (e.g., comprising a processor), smart watches, keyboards, touch screens, mice, a combination thereof, and/or the like. A user of the system 100 can utilize the one or more input devices 106 to input data into the system 100, thereby sharing (e.g., via a direct connection and/or via the one or more networks 104) said data with the server 102. For example, the one or more input devices 106 can send data to the reception component 110 (e.g., via a direct connection and/or via the one or more networks 104). Additionally, the one or more input devices 106 can comprise one or more displays that can present one or more outputs generated by the system 100 to a user. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

In one or more embodiments, the simulation component 108 can analyze (e.g., via one or more generated simulations) a surface participation of one or more superconducting qubits using the BEM. The reception component 110 can receive data entered by a user of the system 100 via the one or more input devices 106. The received data can regard one or more physical and/or operational characteristics of a subject superconducting qubit. Example physical and/or operational characteristics of the subject superconducting qubit can include, but are not limited to, the type of superconducting qubit (e.g., a phase transmission line shunted plasma oscillation ("transmon") qubit, a capacitively-shunted flux qubit ("CSFQ"), a fluxonium qubit, a combination thereof, and/or the like). The reception component 110 can be operatively coupled to the one or more input devices 106 directly (e.g., via an electrical connection) or indirectly (e.g., via the one or more networks 104). Additionally, the reception component 110 can be operatively coupled to one or more components of the server 102 (e.g., one or more components associated with the simulation component 108, system bus 118, processor 120, and/or memory 116) directly (e.g., via an electrical connection) or indirectly (e.g., via the one or more networks 104).

Figure 2:
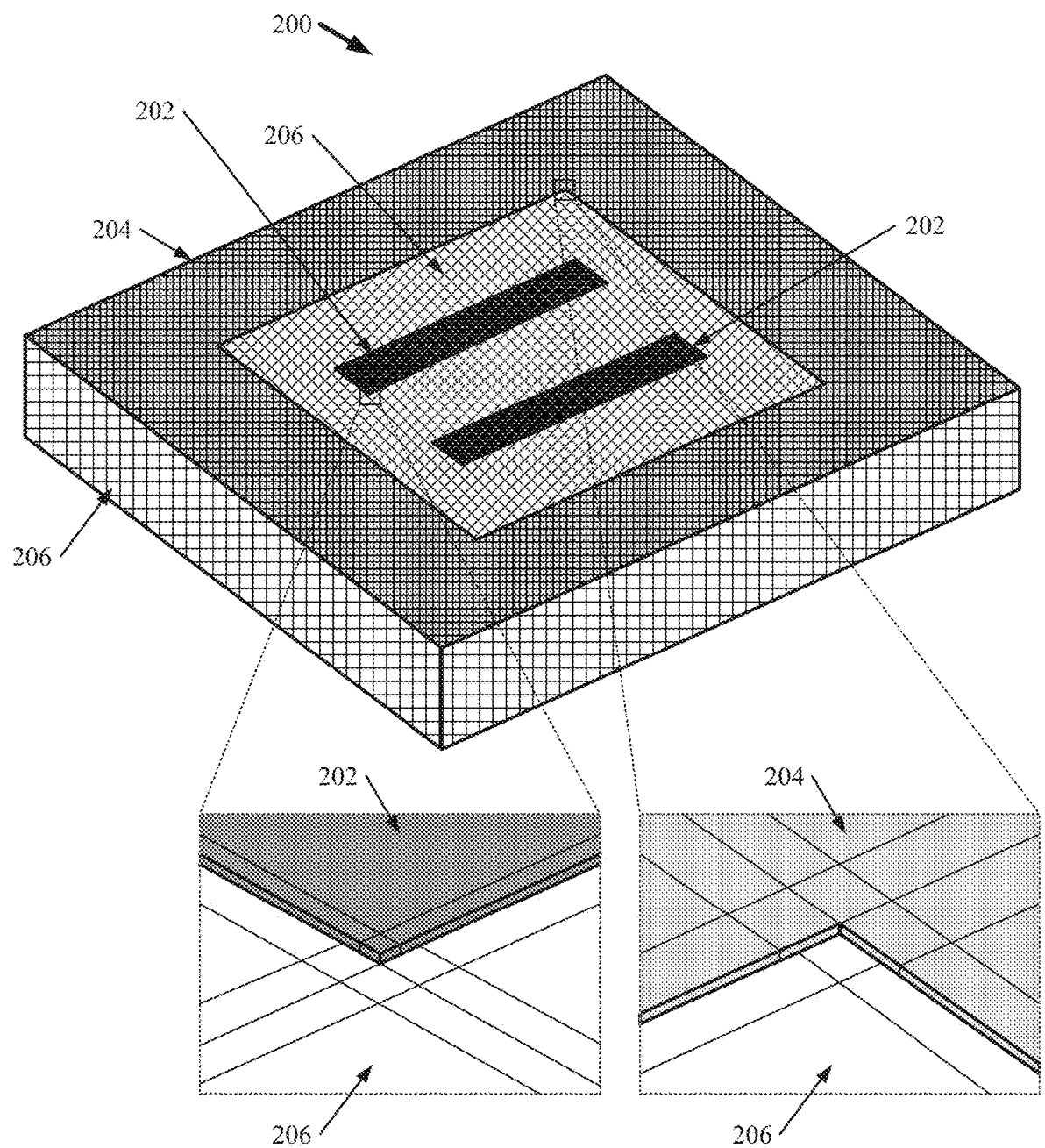
FIG. 2 illustrates a diagram of an example, non-limiting superconducting qubit meshed with the boundary element method in accordance with one or more embodiments described herein.

FIG. 2 illustrates a diagram of an example, non-limiting superconducting qubit structure 200 that can be meshed, by the system 100 (e.g., via the simulation component 108), to facilitate the BEM. Repetitive description of like elements employed in other embodiments described herein is omitted for sake of brevity. As shown in FIG. 2, the superconducting qubit structure 200 can comprise one or more qubit pads 202, one or more ground planes 204, and/or a dielectric substrate 206.

The one or more qubit pads 202 can be qubit metallization layers comprising, for example: niobium, aluminum, titanium nitride, a combination thereof, and/or the like. The one or more ground planes 204 can comprise, for example: niobium, aluminum, a combination thereof, and/or the like. The dielectric substrate 206 can comprise a crystalline high-resistivity semiconductor substrate. For example, the dielectric substrate 206 can comprise high-resistivity silicon such as high-resistivity silicon bulk wafers and/or high-resistivity silicon-on-insulator wafers (e.g., float zone grown silicon and/or czochralski silicon). The dielectric substrate 206 can have a resistivity of, for example, greater than or equal to about 1,000 ohm centimeter (ohm·cm).

One of the energy loss mechanisms that can affect the superconducting qubit structure 200 can occur at one or more amorphous layers formed in interfaces between the one or more qubit pads 202 (e.g., one or more qubit metallization layers) and the dielectric substrate 206 and/or between the dielectric substrate 206 and an adjacent dielectric compound, such as the air. The one or more amorphous layers can be oxides of one or more of the materials comprising the one or more qubit pads 202 and/or the dielectric substrate 106.

FIG. 2 depicts magnified portions of the superconducting qubit structure 200 to exemplify a mesh that can be created by the simulation component 108 using the BEM. The cross-hatching in FIG. 2 can define one or more panels meshed using the BEM. Although FIG. 2 shows an exemplary meshing into rectangular panels, the architecture is not so limited. For example, the mesh can define panels of any polygonal shape, such as triangular meshing. Additionally, one of ordinary skill in the art will recognize that the meshing depicted in the figures (e.g., FIG. 2) is exemplary. For example, the simulation component 108 can mesh the plurality of panels into various dimensions depending on the preference of a user of the system 100. For instance, the mesh of panels can be finer and/or broader than the meshing depicted in FIG. 2.

Additionally, in one or more embodiments, the mesh of panels can be characterized by various dimensions throughout the superconducting qubit structure 200. In other words, the mesh of panels need not be uniform within each feature of the superconducting qubit structure 200. For example, as shown in FIG. 2, the meshing can be finer at edges and/or corners of the one or more qubit pads 202 and/or the one or more ground planes 204. FIG. 2 depicts magnified portions of the superconducting qubit structure 200 to demonstrate how the fineness of the meshing can vary across different positions of the superconducting qubit structure 200.

In one or more embodiments, the conductor analysis component 112 can discretize the conductor surfaces of the one or more qubit pads 202 into a mesh of one or more conductor panels, for example, comprised within the plurality of meshed panels. As shown in FIG. 2, the mesh of conductor panels can characterize the one or more qubit pads 202 (e.g., qubit metallization layers), wherein a portion of the mesh of conductor panels that characterizes an edge of the one or more qubit pads 202 can (e.g., qubit metallization layers) can be finer (e.g., thinner and/or more densely populated) than another portion of the mesh of conductor panels that characterizes a central region of the one or more qubit pads 202 (e.g., qubit metallization layers). Further, the conductor analysis component 112 can apply a unit voltage on each conductor panel separately and/or determine a charge induced on the mesh of conductor panels through a linear system. Although the electric field's surface charge densities diverge on the conductor surfaces, the total charge on a finite area of a conductor panel can be a convergent quantity. Therefore, the conductor analysis component 112 can advantageously mesh thinner panels (e.g., conductor panels) at the edges of the one or more qubit pads 202 and/or ground panels 204; thereby making the linear system well-conditioned. The simulation component 108 can then use the determined charges to perform a surface participation analysis in a very simple way since the electric field on conductor surfaces is directly proportional to the surface charge density. Whereas conventional techniques must make indirect assumptions and/or extrapolations regarding electric field surface charge densities, due at least to the problem of their divergence on the conductor surface, the conductor analysis component 112 can advantageous solve directly for the total charge since said total charge can be a convergent quantity in the respective finite areas of the one or more conductor panels.

Figure 3A:
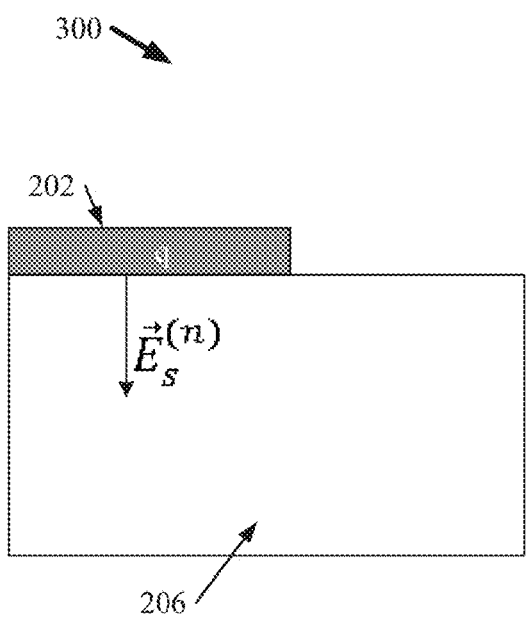
FIG. 3A illustrates a diagram of an example, non-limiting conductor-dielectric interface of a superconducting qubit in accordance with one or more embodiments described herein.
Figure 3B:
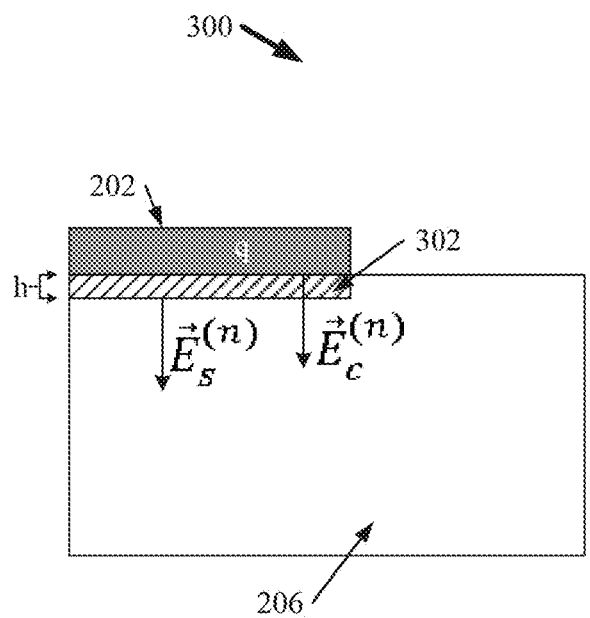
FIG. 3B illustrates a diagram of an example, non-limiting conductor-dielectric interface of a superconducting qubit with an amorphous layer in accordance with one or more embodiments described herein.

FIGS. 3A and 3B illustrate a diagram of an example, non-limiting first boundary conditions 300 for an exemplary conductor-dielectric interface comprised within the superconducting qubit structure 200 in accordance with the one or more embodiments described herein. Repetitive description of like elements employed in other embodiments described herein is omitted for sake of brevity. As shown in FIGS. 3A and 3B, one or more amorphous regions 302 (e.g., comprising one or more amorphous layers, such as amorphous oxide layers) can form at the conductor-dielectric interface when the one or more qubit pads 202 are in an excited state.

In one or more embodiments, the conductor analysis component 112 can compute the total energy stored in the one or more superconducting qubits while in an excited state. Since such a state is a quantum state, the total energy stored can be a superposition of voltage states of the one or more qubit pads 202. However, for qubits as simple as transmon, the simulation component 108 can use charge solutions corresponding to one of the qubit pads 202 set to one volt and all other conductors to zero volt. Thus, the total qubit energy can be given by C=2 where C can be the diagonal capacitance entry corresponding to the qubit pad 202 that is set to one volt.

Given the charge solution on one of the conductor panels facing the substrate is "q", as shown in FIGS. 3A and/or 3B, wherein "q" can be a sum of the free charges "$q_f$" and/or polarization charges "$q_p$" such that $$q = q_f + q_p \text{ and } q_f = \left(\frac{\epsilon_s}{\epsilon_0}\right)q.$$

The electric field normal to a subject meshed panel (e.g., a subject conductor panel) can be characterized by Equation 1, presented below.

$$E_s^{(n)} = \frac{\sigma_f}{\epsilon_s} \qquad (1)$$
$$= \frac{a_f}{\epsilon_s A}$$
$$= \frac{q}{\epsilon_0 A}$$

Wherein "$\epsilon_0$" and "$\epsilon_s$" can be permitivities of a vacuum and the dielectric substrate 206, "A" can be the area of a subject panel (e.g., a subject conductor panel), and "$\sigma_f$" can be the charge density and equal to $$\frac{q_f}{A}.$$

The conductor analysis component 112 can assume that the free charge solution "$q_f$", and thereby the electric field "$E_s^{(n)}$" in the dielectric substrate 206, won't be affected by the presence of a thin amorphous layer (e.g., the conductor analysis component 112 can treat the amorphous layer as a perturbation here) hence the electric field "$E_c^{(n)}$" in the amorphous region 302 will be given (e.g., to the zeroth order in the perturbation caused by the amorphous layer) by the dielectric boundary conditions as characterized by Equation 2, presented below.

$$E_s^{(n)} = \frac{\epsilon_s E_c^{(n)}}{\epsilon_c} \qquad (2)$$
$$= \frac{q_f}{\epsilon_c A}$$
$$= \frac{\epsilon_s q}{\epsilon_c \epsilon_0 A}$$

Wherein "$\epsilon_C$" can be a permittivity of the amorphous layer.

Additionally, since the one or more amorphous regions 302 can be very thin (e.g., range from, for example, greater than or equal to 1 nanometer (nm) and less than or equal to 5 nm), the conductor analysis component 112 can assume that the electric field can be constant over the one or more amorphous layers and/or can compute the total energy stored in the one or more amorphous regions 302 (e.g., amorphous layers) of a subject panel (e.g., a subject conductor panel) in accordance with Equation 3, presented below.

$$W_c = \frac{\epsilon_c}{2}\int_{V_c}(E_c^{(n)})^2 dV \qquad (3)$$
$$= \frac{\epsilon_c}{2}\int_{V_c}\left(\frac{q_f}{\epsilon_c A}\right)^2 dV$$
$$= \frac{1}{2}\frac{q_f^2}{\epsilon_c A}h$$

$$= \frac{1}{2}(\epsilon_s/\epsilon_0)^2 \frac{q^2}{\epsilon_c A} h$$

Wherein "h", as shown in FIG. 3B, can be the thickness of the one or more amorphous regions 302. The conductor analysis component 112 can determine the total energy stored in the one or more amorphous regions 302 at the one or more conductor-dielectric interfaces through the summation of We over one or more (e.g., all of) the conductor panels.

Thus, wherein "q", as shown in FIGS. 3A and/or 3B, can be the solution for the total charge on a respective mesh panel (e.g., a conductor panel) of area "A" for the electrostatic problem without any amorphous region 302 at the conductor-dielectric interface, the conductor analysis component 112 can relate the electric field (which can be normal to the qubit metallization) on the subject panel (e.g., conductor panel) to the charge solution by Equation 1. The one or more amorphous regions 302 can then be treated, by the conductor analysis component 112, as a perturbation and/or the electric field and the one or more amorphous regions 302 can be calculated (e.g., by the conductor analysis component 112) in accordance with Equations 2-3.

Figure 4:
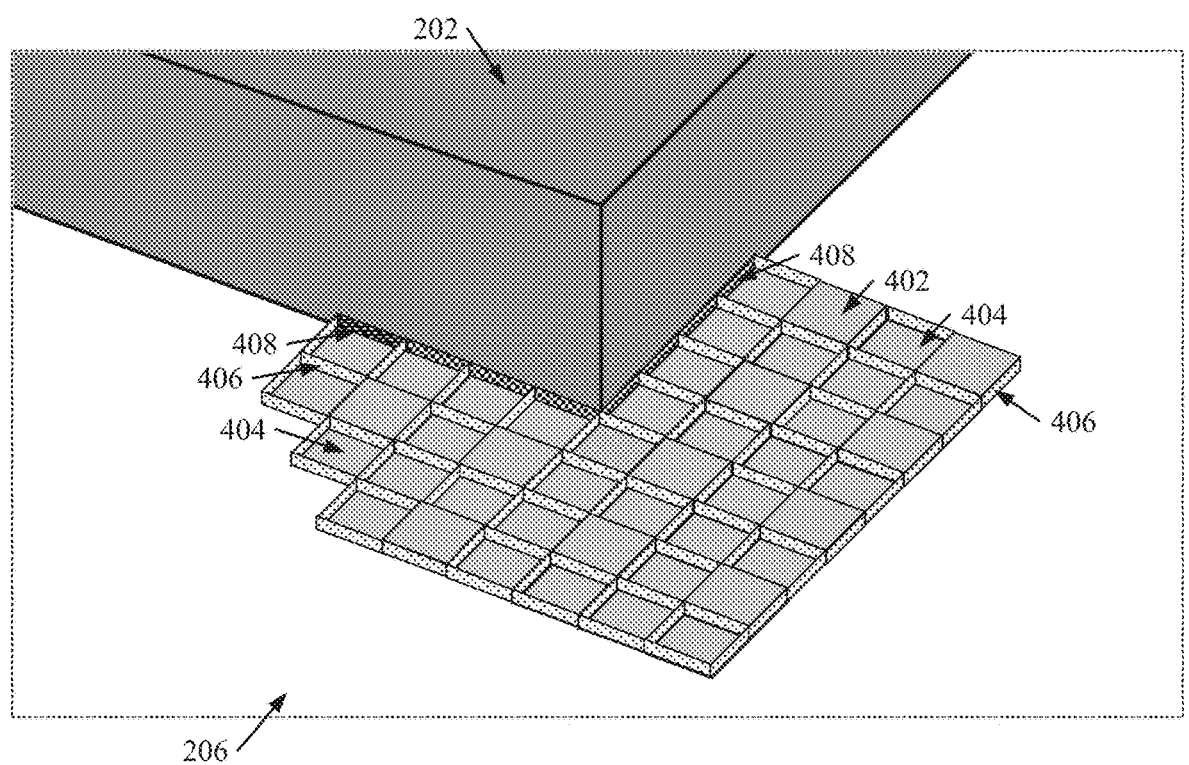
FIG. 4 illustrates a diagram of an example, non-limiting superconducting qubit meshed with the boundary element method in accordance with one or more embodiments described herein.

FIG. 4 illustrates a diagram of an example, non-limiting magnified portion of the superconducting qubit structure 200 that can be partitioned and/or discretized by the simulation component 108 (e.g., via dielectric analysis component 114) in accordance with one or more embodiments described herein. Repetitive description of like elements employed in other embodiments described herein is omitted for sake of brevity.

As shown in FIG. 4, the dielectric analysis component 114 can partition the dielectric-dielectric interface (e.g., between the dielectric substrate 206 and/or adjacent air) into one or more small boxes for the application of the Green's first identity to calculate energy stored in the one or more amorphous regions 302 in said interface. The one or more boxes can be obtained with respect to the meshing of the dielectric-dielectric (e.g., dielectric substrate 206 and air) interface into panels, wherein one or more panels can extrude away from the dielectric substrate 206 (e.g., towards the additional dielectric compound, such as air). While FIG. 4 depicts the one or more boxes extending across a portion of the dielectric substrate 206, the architecture of the meshing of panels and/or partitioning of boxes is not so limited. For example, the one or more boxes can extend across the entirety of the dielectric-dielectric interface.

Further, as shown in FIG. 4, the top panels 402 and/or bottom panels 404 of the one or more boxes can be represented in grey, wherein some of the top panels 402 of respective boxes not shown for clarity. Additionally, side panels 406 of the one or more boxes can be represented by a dot pattern, except with regards to conductor side panel 408, which can be represented by a cross-hatching pattern. In one or more embodiments, the one or more qubit pads 202 and/or the one or more conductor side panels 408 can be set (e.g., by the simulation component 108) to one volt. As a result of the meshing and/or partitioning depicted in FIG. 4, contributions of the side panels 406 can cancel each other, thereby the only contribution to the surface participation comes from the surface integral of the electric field on the conductor side panels 408. Advantageously, the dielectric analysis component 114 is able to optimize upon said cancellations to simplify and/or reduce computational requirements.

Figures 5A, 5B:
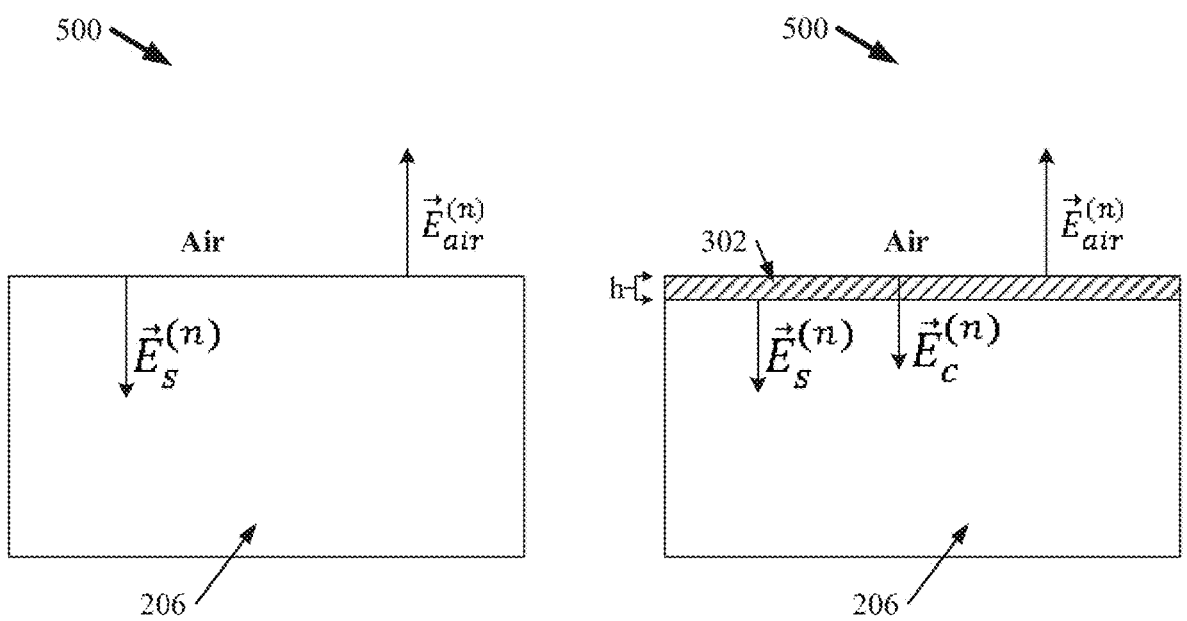
FIG. 5A illustrates a diagram of an example, non-limiting dielectric-dielectric interface of a superconducting qubit in accordance with one or more embodiments described herein.
FIG. 5B illustrates a diagram of an example, non-limiting dielectric-dielectric interface of a superconducting qubit with an amorphous layer in accordance with one or more embodiments described herein

FIGS. 5A and/or 5B illustrate diagrams of an example, non-limiting second boundary conditions 500 for a normal electric field at the dielectric-dielectric interface in accordance with one or more embodiments described herein. Repetitive description of like elements employed in other embodiments described herein is omitted for sake of brevity.

The dielectric analysis component 114 can relate the energy stored in the one or amorphous regions 302 to the surface polarization charge density at the dielectric-dielectric interface and/or to the electric field on the side surfaces of the one or more qubit pads 202, which can be set to one volt. The dielectric analysis component 114 can utilize Green's first identity with an electric potential that can be characterized by Equation 4, presented below.

$$\int_V \Phi \nabla^2 + \nabla \Phi \cdot \nabla \Phi \partial V = \oint_{\partial V} \Phi \nabla \Phi \cdot dS \qquad (4)$$

Wherein "Φ" can be the electric potential, "∂V" can be the surface boundary of the volume V. Further, "dS" can be the surface normal. Additionally, $E=-\nabla\Phi$ and $\nabla^2\Phi=0$ in a homogenous dielectric, and the dielectric analysis component 114 can apply the identity described above to a subject amorphous region 302 in the dielectric-dielectric interface in accordance with Equation 5, presented below.

$$\Sigma \int_{V_c} E^2 dV = -\Sigma \oint_{\partial V} \Phi E \cdot dS \qquad (5)$$

Wherein the sum is over the partitioning of the one or more amorphous regions 302 in the dielectric-dielectric interface into mesh panels by the BEM.

The dielectric analysis component 114 can account for each volume "Vc" in the sum above as being corresponding to the box obtained by extruding the BEM mesh panel towards the additional dielectric (e.g., the air) in the normal direction to the interface by an amount "h" which is the thickness of the one or more amorphous regions 302, as shown in FIGS. 5A and/or 5B. Since each side panel 406 of the mesh boxes can enter the sum in the right-hand side of Equation 5 twice but with an opposite surface normal "dS", the contribution coming from these side panels 406 can cancel each other. Whereas, the conductor side panels 408 adjacent to the one or more qubit pad 202, which can be set to one volt, can give a non-zero contribution (e.g., since all other conductors are set to zero volt). Therefore, the dielectric analysis component 114 can simplify Equation 5 in accordance with Equation 6, presented below.

$$\Sigma \int_{V_c} E^2 dV = \Sigma A(\Phi(a)E_c^{(n)} - \Phi(b)E_c^{(n)}) + \Sigma \int_{Q_S} E \cdot dS \qquad (6)$$

Wherein "a" can be a point on the top panel 402 adjacent to the additional dielectric (e.g., air), and "b" can be a point on the bottom panel 404 adjacent to dielectric substrate 206. Further, the dielectric analysis component 114 can assumed that the normal component of the electric field "$E_c^{(n)}$" can be constant over the subject thin amorphous region 302. Additionally, "QS" can correspond to conductor side panels 408 on the one or more qubit pads 202 set to, for example, one volt.

Furthermore, the dielectric analysis component 114 can Taylor expand the potential "Φ" in the one or more amorphous regions 302 in the normal direction in accordance with Equation 7, presented below.

$$\Phi(b) = \Phi(a) + \frac{\partial \Phi}{\partial n} h \qquad (7)$$

Therefore, the dielectric analysis component 114 can modify Equation 6 in accordance with Equation 8, presented below.

$$\sum A(\Phi(a)E_c^{(n)} - \Phi(b)E_c^{(n)}) = \sum -A\frac{\partial \Phi}{\partial n}hE_c^{(n)} \quad (8)$$
$$= \sum A(E_c^{(n)})^2 h$$

Additionally, the dielectric analysis component 114 can determine the total energy "$W_c$" stored in the one or more amorphous regions 302 at the dielectric-dielectric interface in accordance with Equation 9, presented below.

$$W_c = \frac{1}{2}\epsilon_c \sum \int_{V_c} E^2 dV \quad (9)$$
$$= \frac{1}{2}\sum \epsilon_c A(E_c^{(n)})^2 h + \frac{1}{2}\epsilon_c \sum \int_{QS} E \cdot dS$$

Thus, a surface participation at the dielectric-dielectric interface can depend on the normal component of the electric field. Given two-dimension ("2D") coplaner waveguide ("CPW") qubit geometries said component can be much smaller compared to the tangential component. For example, the electric field in the one or more thin amorphous regions 302 (e.g., at the dielectric-dielectric interface) can be very nearly tangential; thereby the contribution to the surface participation due to normal components can be minor.

The dielectric analysis component 114 can further relate the normal component of the electric field to one or more surface polarization charges that can be given by the equivalent charge solution. The polarization charge density "$\sigma_p$" at a dielectric-dielectric interface can be characterized by Equation 10, presented below.

$$\sigma_p = \epsilon_0 E_{air}^{(n)}\left(1 - \frac{\epsilon_{air}}{\epsilon_s}\right) \quad (10)$$

In the presence of the one or more amorphous regions 302, the electric field solution "$E_{air}^{(n)}$" (e.g., wherein air is the additional dielectric) won't be affected (e.g., to a zeroth order in the perturbation created by the one or more amorphous regions 302) and/or $$E_{air}^{(n)} = \frac{\epsilon_c}{\epsilon_s}E_c^{(n)}$$

by the dielectric boundary condition. Therefore, the polarization charge density can be characterized by Equation 11, presented below.

$$\sigma_p = \epsilon_0\left(\frac{\epsilon_c}{\epsilon_s}E_c^{(n)}\right)\left(1 - \frac{\epsilon_{air}}{\epsilon_s}\right) \quad (11)$$

Thus, the dielectric analysis component 114 can solve for the normal component of the electric field in accordance with Equation 12, presented below.

$$E_c^{(n)} = \frac{\sigma_p}{\epsilon_0 \frac{\epsilon_c}{\epsilon_{air}}\left(1 - \frac{\epsilon_{air}}{\epsilon_s}\right)} \quad (12)$$

Therefore, Equation 9 can be modified based on Equation 12 and/or the dielectric analysis component 114 can analyze a surface participation at a dielectric-dielectric interface in accordance with Equation 13, presented below.

$$\frac{1}{2}\sum \epsilon_c A(E_c^{(n)})^2 h = \frac{1}{2}\sum \epsilon_c A\left(\frac{\sigma_p}{\epsilon_0 \frac{\epsilon_c}{\epsilon_{air}}\left(1 - \frac{\epsilon_{air}}{\epsilon_s}\right)}\right)^2 h \quad (13)$$
$$= \frac{1}{2}\sum \epsilon_c \frac{q_p^2}{\epsilon_0^2\left(\frac{\epsilon_c}{\epsilon_{air}} - \frac{\epsilon_c}{\epsilon_s}\right)^2} h/A$$
$$= \frac{1}{2}\sum \frac{q_p^2}{\epsilon_c\left(1 - \frac{\epsilon_0}{\epsilon_s}\right)^2} h/A$$

Wherein "$q_p$" can be the polarization charge solution assuming $\epsilon_{air}=\epsilon_0$. The polarization charge "$q_p$" can be equal to the total charge "$q$" (e.g., which can be the solution of the equivalent charge formulation) at the dielectric-dielectric interfaces in accordance with Equation 14, presented below. The dielectric analysis component 114 can further evaluate the last term of Equation 9 by using the discretization of the one or more conductor side panels 408 at one volt.

$$\frac{1}{2}\epsilon_c \sum \int_{QS} E \cdot dS = \frac{1}{2}\epsilon_c \sum \int_{QS} E_c^{(n)} dS \quad (14)$$
$$= \frac{1}{2}\epsilon_c \sum \int_{QS}\left(\frac{\epsilon_{air}q}{\epsilon_c \epsilon_0 A}\right)dS$$
$$= \frac{1}{2}\sum \left(\frac{h}{t}\right)q$$

Wherein the sum can be over the conductor side panels 408, and wherein "t" can be the height of the conductor side panels 408 and/or the metallization thickness. Additionally, the dielectric analysis component 114 can assume that the width of the conductor and dielectric panels are the same where they meet. Therefore, the dielectric component 114 can advantageously determine an accurate computation of charge density and/or electric field at dielectric-dielectric interfaces, such as between the dielectric substrate 206 of a subject superconducting qubit and/or adjacent air.

Figure 6:
FIG. 6 illustrates a flow diagram of an example, non-limiting method that can facilitate analyzing a surface participation of one or more superconducting qubits using the boundary element method in accordance with one or more embodiments described herein.

FIG. 6 illustrates a flow diagram of an example, non-limiting method 600 that can facilitate a surface participation analysis on one or more superconducting qubits using the BEM in accordance with one or more embodiments described herein. Repetitive description of like elements employed in other embodiments described herein is omitted for sake of brevity.

At 602, the method 600 can comprise analyzing (e.g., via the simulation component 108), by a system 100 operatively coupled to a processor 120, a surface participation of one or more superconducting qubits by discretizing one or more conductor-dielectric interfaces and/or one or more dielectric-dielectric interfaces into a plurality of panels.

At 604, the method 600 can comprise using (e.g., via the simulation component 108), by the system 100, the BEM to analyze the surface participation. For example, the simulation component 108 can analyze a surface participation of the one or more superconducting qubits in accordance with Equations 1-14 described herein. An advantage of method 600 can be that various parameters (e.g., energy stored, charge density, and/or electric field) associated with the conductor-dielectric and/or the dielectric-dielectric interfaces can be computed without the use of conventional extrapolations (e.g., such as assuming a constant power exponent for the electric field in one or more regions of the superconducting qubit subject to electric field and/or charge density divergence); thereby reducing computational requirements and/or increasing the accuracy of the analysis.

Figure 7:
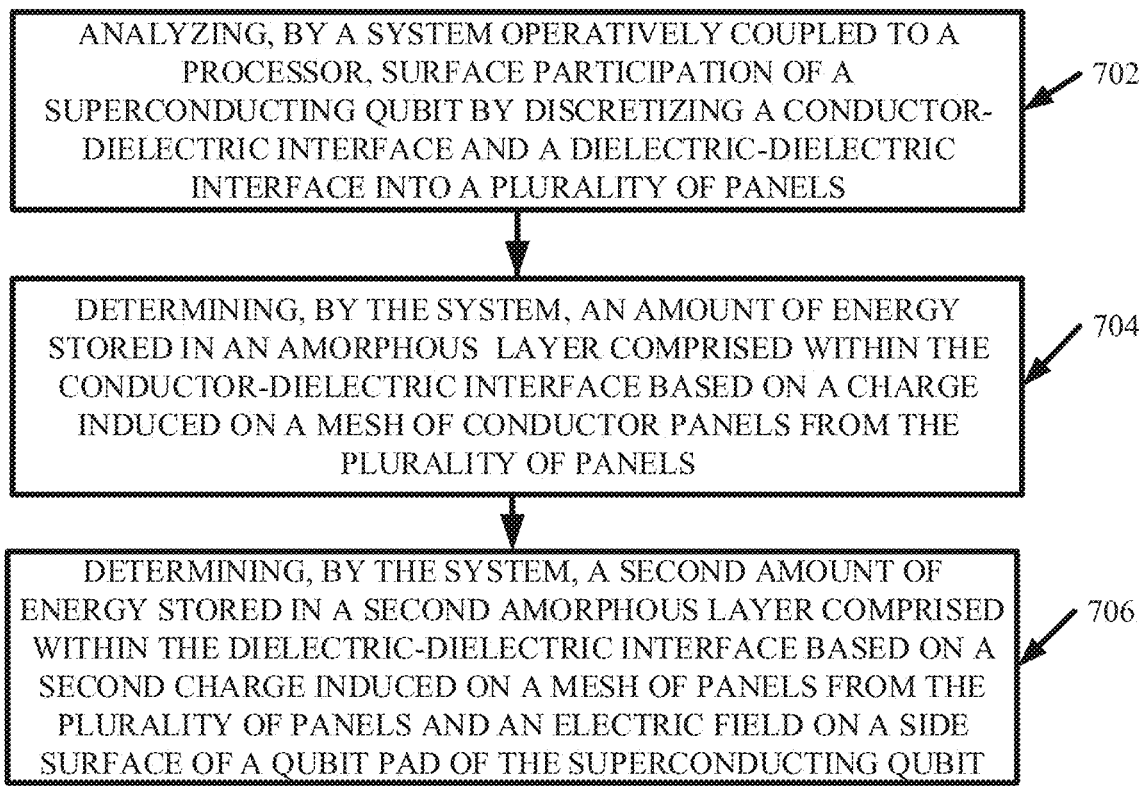
FIG. 7 illustrates a flow diagram of an example, non-limiting method that can facilitate analyzing a surface participation of one or more superconducting qubits using the boundary element method in accordance with one or more embodiments described herein.

FIG. 7 illustrates a flow diagram of an example, non-limiting method 700 that can facilitate a surface participation analysis on one or more superconducting qubits using the BEM in accordance with one or more embodiments described herein. Repetitive description of like elements employed in other embodiments described herein is omitted for sake of brevity.

At 702, the method 700 can comprise analyzing (e.g., via the simulation component 108), by a system 100 operatively coupled to a processor 120, a surface participation of one or more superconducting qubits by discretizing one or more conductor-dielectric interfaces and/or one or more dielectric-dielectric interfaces into a plurality of panels.

At 704, the method 700 can comprise determining (e.g., via the conductor analysis component 112), by the system 100, an amount of energy stored in an amorphous layer (e.g., amorphous region 302) comprised within the conductor-dielectric interface based on a charge induced on a mesh of conductor panels from the plurality of panels.

At 706, the method 700 can also comprise determining (e.g., via the dielectric analysis component 114), by the system 100, a second amount of energy stored in a second amorphous layer (e.g., amorphous region 302) comprised within the dielectric-dielectric interface based on a second charge induced on a mesh of panels from the plurality of panels and an electric field on a side surface of one or more qubit pads 202 of the superconducting qubit.

An advantage of method 700 can be that various parameters (e.g., energy stored, charge density, and/or electric field) associated with the conductor-dielectric and/or the dielectric-dielectric interfaces can be computed without the use of conventional extrapolations (e.g., such as assuming a constant power exponent for the electric field in one or more regions of the superconducting qubit subject to electric field and/or charge density divergence); thereby reducing computational requirements and/or increasing the accuracy of the analysis. For example, although charge densities diverge, like electric fields, at the conductor edges and/or corners of the superconducting qubit, the total charges on respective conductor panels of the mesh can be convergent quantities. Further, the surface participation analysis can include an accurate computation of charge density and/or electric field at dielectric-dielectric interfaces, such as between a dielectric substrate 206 of the superconducting qubit and/or adjacent air.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
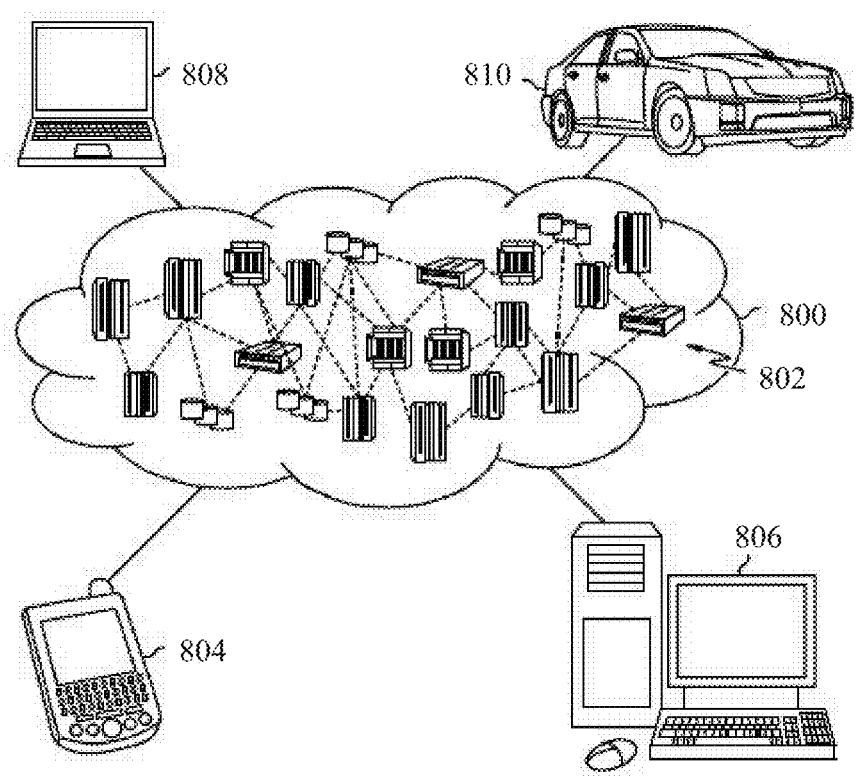
FIG. 8 depicts a cloud computing environment in accordance with one or more embodiments described herein.

Referring now to FIG. 8, illustrative cloud computing environment 800 is depicted. Repetitive description of like elements employed in other embodiments described herein is omitted for sake of brevity. As shown, cloud computing environment 800 includes one or more cloud computing nodes 802 with which local computing devices used by cloud consumers, such as, for example, personal digital assistant (PDA) or cellular telephone 804, desktop computer 806, laptop computer 808, and/or automobile computer system 810 may communicate. Nodes 802 may communicate with one another. They may be grouped (not shown) physically or virtually, in one or more networks, such as Private, Community, Public, or Hybrid clouds as described hereinabove, or a combination thereof. This allows cloud computing environment 800 to offer infrastructure, platforms and/or software as services for which a cloud consumer does not need to maintain resources on a local computing device. It is understood that the types of computing devices 804-810 shown in FIG. 8 are intended to be illustrative only and that computing nodes 802 and cloud computing environment 800 can communicate with any type of computerized device over any type of network and/or network addressable connection (e.g., using a web browser).

Figure 9:
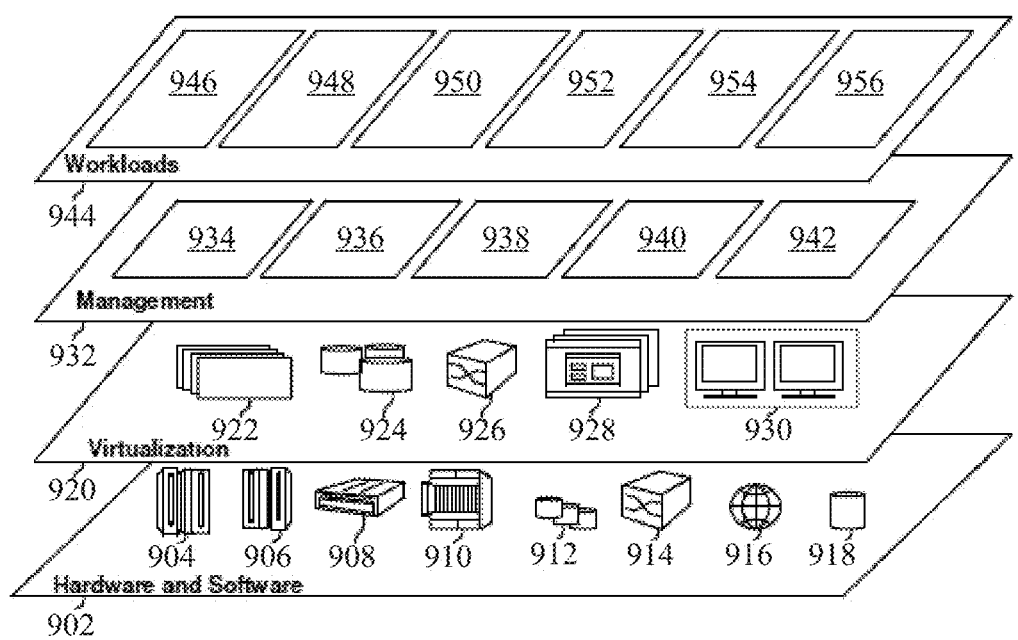
FIG. 9 depicts abstraction model layers in accordance with one or more embodiments described herein.

Referring now to FIG. 9, a set of functional abstraction layers provided by cloud computing environment 800 (FIG. 8) is shown. Repetitive description of like elements employed in other embodiments described herein is omitted for sake of brevity. It should be understood in advance that the components, layers, and functions shown in FIG. 9 are intended to be illustrative only and embodiments of the invention are not limited thereto. As depicted, the following layers and corresponding functions are provided.

Hardware and software layer 902 includes hardware and software components. Examples of hardware components include: mainframes 904; RISC (Reduced Instruction Set Computer) architecture based servers 906; servers 908; blade servers 910; storage devices 912; and networks and networking components 914. In some embodiments, software components include network application server software 916 and database software 918.

Virtualization layer 920 provides an abstraction layer from which the following examples of virtual entities may be provided: virtual servers 922; virtual storage 924; virtual networks 926, including virtual private networks; virtual applications and operating systems 928; and virtual clients 930.

In one example, management layer 932 may provide the functions described below. Resource provisioning 934 provides dynamic procurement of computing resources and other resources that are utilized to perform tasks within the cloud computing environment. Metering and Pricing 936 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 938 provides access to the cloud computing environment for consumers and system administrators. Service level management 940 provides cloud computing resource allocation and management such that required service levels are met. Service Level Agreement (SLA) planning and fulfillment 942 provide pre-arrangement for, and procurement of, cloud computing resources for which a future requirement is anticipated in accordance with an SLA.

Workloads layer 944 provides examples of functionality for which the cloud computing environment may be utilized. Examples of workloads and functions which may be provided from this layer include: mapping and navigation 946; software development and lifecycle management 948; virtual classroom education delivery 950; data analytics processing 952; transaction processing 954; and surface participation analysis 956. Various embodiments of the present invention can utilize the cloud computing environment described with reference to FIGS. 8 and 9 to analyze a surface participation analysis of a superconducting qubit using the BEM.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 10:
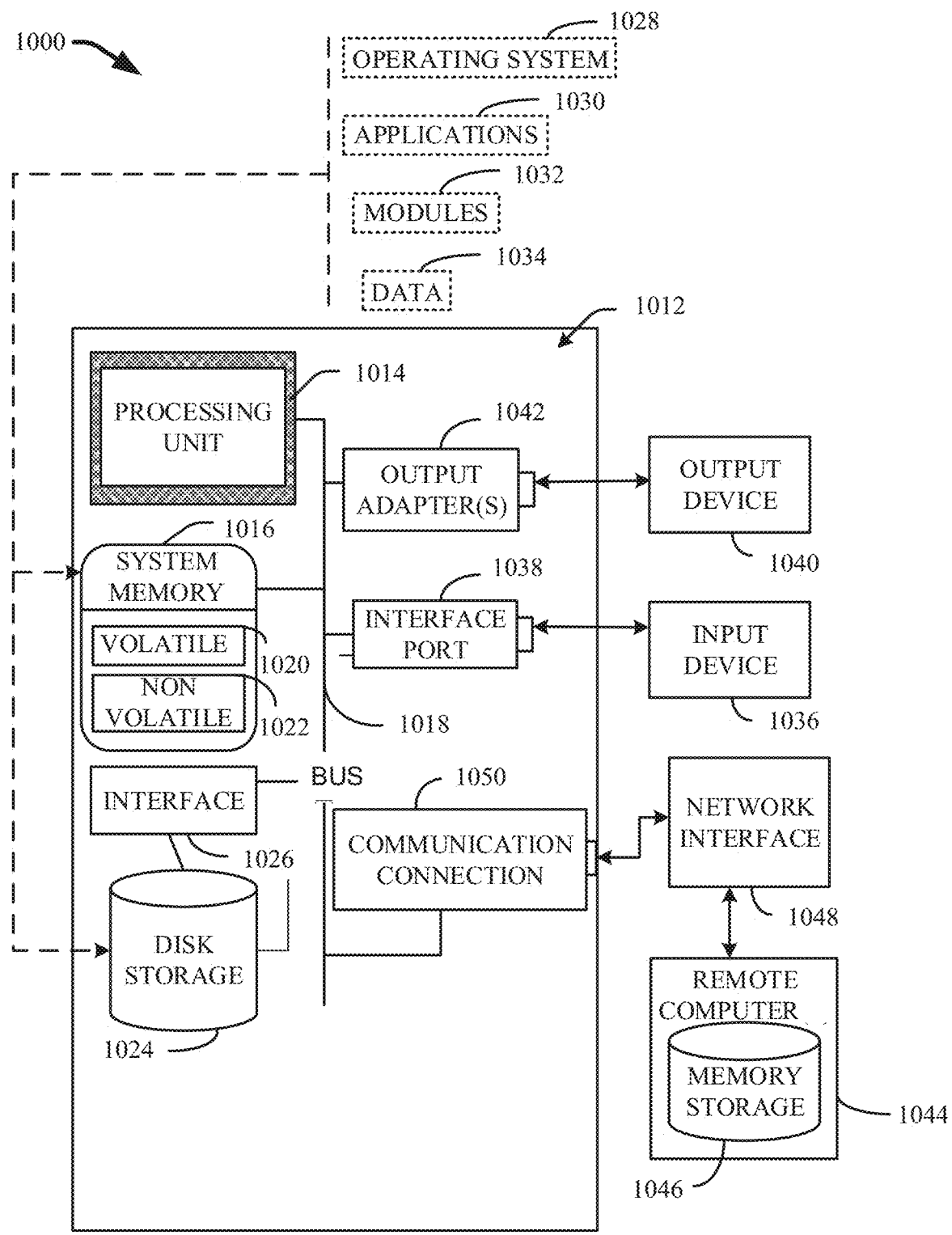
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity. With reference to FIG. 10, a suitable operating environment 1000 for implementing various aspects of this disclosure can include a computer 1012. The computer 1012 can also include a processing unit 1014, a system memory 1016, and a system bus 1018. The system bus 1018 can operably couple system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, can be stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface can be used, such as interface 1026. FIG. 10 also depicts software that can act as an intermediary between users and the basic computer resources described in the suitable operating environment 1000. Such software can also include, for example, an operating system 1028. Operating system 1028, which can be stored on disk storage 1024, acts to control and allocate resources of the computer 1012. System applications 1030 can take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through one or more input devices 1036. Input devices 1036 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices can connect to the processing unit 1014 through the system bus 1018 via one or more interface ports 1038. The one or more Interface ports 1038 can include, for example, a serial port, a parallel port, a game port, and a universal serial bus (USB). One or more output devices 1040 can use some of the same type of ports as input device 1036. Thus, for example, a USB port can be used to provide input to computer 1012, and to output information from computer 1012 to an output device 1040. Output adapter 1042 can be provided to illustrate that there are some output devices 1040 like monitors, speakers, and printers, among other output devices 1040, which require special adapters. The output adapters 1042 can include, by way of illustration and not limitation, video and sound cards that provide a means of connection between the output device 1040 and the system bus 1018. It should be noted that other devices and/or systems of devices provide both input and output capabilities such as one or more remote computers 1044.

Computer 1012 can operate in a networked environment using logical connections to one or more remote computers, such as remote computer 1044. The remote computer 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer 1044. Remote computer 1044 can be logically connected to computer 1012 through a network interface 1048 and then physically connected via communication connection 1050. Further, operation can be distributed across multiple (local and remote) systems. Network interface 1048 can encompass wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). One or more communication connections 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Embodiments of the present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a memory that stores computer executable components; and
    a processor that executes the computer executable components stored in the memory, wherein the computer executable components comprise:
        a simulation component, operatively coupled to the processor, that:
            analyzes a surface participation of a superconducting qubit by partitioning a conductor-dielectric interface and a dielectric-dielectric interface into a plurality of panels, wherein the dielectric-dielectric interface comprises a first region where a dielectric substrate of the superconducting qubit is adjacent to a dielectric compound, and at least one panel of the plurality of panels comprises a three-dimensional panel that extends from the dielectric substrate into the dielectric compound, and
            determines amounts of energy stored in respective amorphous layers comprised within the conductor-dielectric interface and the dielectric-dielectric interface based on a result of the analysis of the surface participation.

2. The system of claim 1, wherein the simulation component further uses a boundary element method to analyze the surface participation.

3. The system of claim 1, wherein the conductor-dielectric interface comprises a second region where a qubit metallization layer of the superconducting qubit is adjacent to the dielectric substrate comprising a crystalline semiconductor substrate, and wherein the dielectric compound comprises air.

4. The system of claim 1, further comprising:
a conductor analysis component, operatively coupled to the processor, that determines the amount of energy stored in the amorphous layer comprised within the conductor-dielectric interface based on a charge induced on a mesh of conductor panels from the plurality of panels.

5. The system of claim 4, wherein the mesh of conductor panels characterizes a qubit metallization layer of the superconducting qubit, and wherein a first portion of the mesh of conductor panels characterizes an edge of the qubit metallization layer and is finer than a second portion of the mesh of conductor panels, which characterize a central region of the qubit metallization layer.

6. The system of claim 1, further comprising:
a dielectric analysis component, operatively coupled to the processor, that determines the amount of energy stored in the amorphous layer comprised within the dielectric-dielectric interface based on a charge induced on a mesh of panels from the plurality of panels and an electric field on a side surface of a qubit pad of the superconducting qubit.

7. The system of claim 4, wherein the charge induced on the mesh of conductor panels is a convergent quantity.

8. The system of claim 1, wherein the simulation component analyzes the surface participation in a cloud computing environment.

9. A computer-implemented method, comprising:
analyzing, by a system operatively coupled to a processor, a surface participation of a superconducting qubit by partitioning a conductor-dielectric interface and a dielectric-dielectric interface into a plurality of panels, wherein the dielectric-dielectric interface comprises a first region where a dielectric substrate of the superconducting qubit is adjacent to a dielectric compound, and at least one panel of the plurality of panels comprises a three-dimensional panel that extends from the dielectric substrate into the dielectric compound; and
determining, by the system, amounts of energy stored in respective amorphous layers comprised within the conductor-dielectric interface and the dielectric-dielectric interface based on a result of the analysis of the surface participation.

10. The computer-implemented method of claim 9, wherein the analyzing comprises using a boundary element method to analyze the surface participation.

11. The computer-implemented method of claim 9, wherein the conductor-dielectric interface comprises a second region where a qubit metallization layer of the superconducting qubit is adjacent to the dielectric substrate comprising a crystalline semiconductor substrate, and wherein the dielectric compound comprises air.

12. The computer-implemented method of claim 9, further comprising:
determining, by the system, the amount of energy stored in the amorphous layer comprised within the conductor-dielectric interface based on a charge induced on a mesh of conductor panels from the plurality of panels.

13. The computer-implemented method of claim 12, wherein the mesh of conductor panels characterizes a qubit metallization layer of the superconducting qubit, and wherein a first portion of the mesh of conductor panels characterizes an edge of the qubit metallization layer and is finer than a second portion of the mesh of conductor panels, which characterize a central region of the qubit metallization layer.

14. The computer-implemented method of claim 9, further comprising:
determining, by the system, the amount of energy stored in the amorphous layer comprised within the dielectric-dielectric interface based on a charge induced on a mesh of panels from the plurality of panels and an electric field on a side surface of a qubit pad of the superconducting qubit.

15. The computer-implemented method of claim 12, wherein the charge induced on the mesh of conductor panels is a convergent quantity.

16. A computer program product that determines a surface participation ratio of a superconducting qubit, the computer program product comprising a computer readable storage medium having program instructions embodied therewith, the program instructions executable by a processor to cause the processor to:
analyze, by a system operatively coupled to the processor, a surface participation of the superconducting qubit by partitioning a conductor-dielectric interface and a dielectric-dielectric interface into a plurality of panels, wherein the dielectric-dielectric interface comprises a first region where a dielectric substrate of the superconducting qubit is adjacent to a dielectric compound, and at least one panel of the plurality of panels comprises a three-dimensional panel that extends from the dielectric substrate into the dielectric compound; and
determining, by the system, amounts of energy stored in respective amorphous layers comprised within the conductor-dielectric interface and the dielectric-dielectric interface based on a result of the analysis of the surface participation.

17. The computer program product of claim 16, wherein the analyzing comprises using a boundary element method to analyze the surface participation, wherein the conductor-dielectric interface comprises a second region where a qubit metallization layer of the superconducting qubit is adjacent to the dielectric substrate comprising a crystalline semiconductor substrate, and wherein the dielectric compound comprises air.

18. The computer program product of claim 16, wherein the program instructions further cause the processor to:
determine, by the system, the amount of energy stored in the amorphous layer comprised within the conductor-dielectric interface based on a charge induced on a mesh of conductor panels from the plurality of panels, wherein the mesh of conductor panels characterizes a qubit metallization layer of the superconducting qubit, and wherein a first portion of the mesh of conductor panels characterizes an edge of the qubit metallization layer and is finer than a second portion of the mesh of conductor panels, which characterizes a central region of the qubit metallization layer.

19. The computer program product of claim 16, wherein the program instructions further cause the processor to:
determine, by the system, the amount of energy stored in the amorphous layer comprised within the dielectric-dielectric interface based on a second charge induced on a mesh of panels from the plurality of panels and an electric field on a side surface of a qubit pad of the superconducting qubit, wherein the amount of energy stored in the amorphous layer is a function of the charge induced on the mesh of conductor panels.

20. A system, comprising:
a memory that stores computer executable components; and
a processor that executes the computer executable components stored in the memory, wherein the computer executable components comprise:
   a simulation component, operatively coupled to the processor, that:
      analyzes a surface participation of a superconducting qubit with a boundary element method; and
      determines, based on the analysis, amounts of energy stored in respective amorphous regions of a conductor-dielectric interface and a dielectric-dielectric interface of the superconducting qubit, wherein the dielectric-dielectric interface comprises a first region where a dielectric substrate of the superconducting qubit is adjacent to air, and the boundary element method employs at least one three-dimensional panel that extends from the dielectric substrate into the air.

21. The system of claim 20, further comprising:
a conductor analysis component, operatively coupled to the processor, that determines the amount of energy stored in the amorphous region of the conductor-dielectric interface based on a first charge induced on a mesh of conductor panels at the conductor-dielectric interface; and
a dielectric analysis component, operatively coupled to the processor, that determines the amount of energy stored in the amorphous region of the dielectric-dielectric interface based on a second charge induced on a mesh of panels at the dielectric-dielectric interface and an electric field on a side surface of a qubit pad of the superconducting qubit wherein the mesh of panels comprises the at least one three-dimensional panel.

22. The system of claim 21, wherein the mesh of conductor panels characterizes a qubit metallization layer of the superconducting qubit, and wherein a first portion of the mesh of conductor panels characterizes an edge of the qubit metallization layer and is finer than a second portion of the mesh of conductor panels, which characterize a central region of the qubit metallization layer.

23. A computer program product that determines a surface participation ratio of a superconducting qubit, the computer program product comprising a computer readable storage medium having program instructions embodied therewith, the program instructions executable by a processor to cause the processor to:
   analyze, by a system operatively coupled to a processor, a surface participation of the superconducting qubit with a boundary element method; and
   determines, based on the analysis, amounts of energy stored in respective amorphous regions of a conductor-dielectric interface and a dielectric-dielectric interface of the superconducting qubit, wherein the dielectric-dielectric interface comprises a first region where a dielectric substrate of the superconducting qubit is adjacent to air, and the boundary element method employs at least one three-dimensional panel that extends from the dielectric substrate into the air.

24. The computer program product of claim 23, wherein the program instructions further cause the processor to:
   determine, by the system, the amount of energy stored in the amorphous region at the conductor-dielectric interface based on a charge induced on a mesh of conductor panels at the conductor-dielectric interface; and
   determine, by the system, the amount of energy stored in the amorphous region of the dielectric-dielectric interface based on a second charge induced on a mesh of panels at the dielectric-dielectric interface and an electric field on a side surface of a qubit pad of the superconducting qubit, wherein the mesh of panels comprises the at least one three-dimensional panel.

25. The computer program product of claim 24, wherein the mesh of conductor panels characterizes a qubit metallization layer of the superconducting qubit, and wherein a first portion of the mesh of conductor panels characterizes an edge of the qubit metallization layer and is finer than a second portion of the mesh of conductor panels, which characterize a central region of the qubit metallization layer.

* * * * *